United States Patent Office 2,701,249
Patented Feb. 1, 1955

2,701,249

PREPARATION OF 2-MERCAPTO-5,6-DIMETHYL-BENZIMIDAZOLE AND 5,6 - DIMETHYLBENZIMIDAZOLE

Frank R. Koniuszy, Rahway, and Karl Folkers, Plainfield, N. J., assignors to Merck & Co., Inc., Rahway, N. J., a corporation of New Jersey No Drawing. Application January 30, 1951,
Serial No. 208,652

2 Claims. (Cl. 260—309.2)

This application relates to substituted benzimidazoles, and specifically to processes for the preparation of the new compound, 2-mercapto-5,6-dimethylbenzimidazole, and for the conversion of this new compound to 5,6-dimethylbenzimidazole.

This new compound, 2-mercapto-5,6-dimethylbenzimidazole, possesses growth promoting properties similar to that of vitamin $B_{12}$, and can be used for incorporation in animal diets as a source of the growth promoting agent. In addition, it is also useful as an intermediate in the preparation of 5,6-dimethylbenzimidazole which also has growth promoting activity.

It is an object of the present invention to provide the new compound, 2-mercapto-5,6-dimethylbenzimidazole. A further object is to provide processes suitable for the preparation of this compound. Another object is to provide a process for preparing 5,6-dimethylbenzimidazole from 2-mercapto-5,6-dimethylbenzimidazole. Other objects will be apparent from the detailed description hereinafter provided.

In accordance with this invention, 2-mercapto-5,6-dimethylbenzimidazole is prepared by reacting 1,2-dimethyl-4,5-diaminobenzene with carbon disulfide. This reaction may be shown as follows:

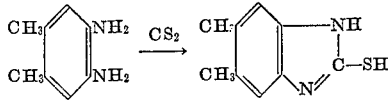

In carrying out this reaction, it is found that maximum yields of the desired product are obtained under optimum conditions by reacting the 1,2-dimethyl-4,5-diaminobenzene with carbon disulfide in an inert solvent medium (inter alia, benzene, toluene, xylene, aliphatic hydrocarbons, and the like). For example, the reaction is effected by reacting 1,2-dimethyl-4,5-diaminobenzene with carbon disulfide in benzene medium under reflux. After the reaction is completed, the reaction product, 2-mercapto-5,6-dimethylbenzimidazole is readily recovered by concentrating the reaction mixture to dryness under reduced pressure, and crystallizing the residue from a suitable solvent such as an acetone-petroleum ether mixture. If desired the product can be purified further by recrystallization from the same solvent mixture.

The product, 2-mercapto-5,6-dimethylbenzimidazole is obtained in the form of gleaming white crystals having a melting point of 325° C.

The 2-mercapto-5,6-dimethylbenzimidazole is readily converted to 5,6-dimethylbenzimidazole by reacting the mercapto compound with Raney nickel. For example, the sulfhydryl group is cleaved by reacting a solution of 2-mercapto-5,6-dimethylbenzimidazole in n-butyl alcohol with Raney nickel. After removing the catalyst from the resulting reaction product, the 5,6-dimethylbenzimidazole is recovered by concentrating the solution to dryness under reduced pressure, triturating the residue with acetone, concentrating the acetone extract to a small volume, adding petroleum ether to the acetone extract, and cooling the resulting solution thereby causing the precipitation of the 5,6-dimethylbenzimidazole in crystalline form.

The following example serves to illustrate this invention:

*Example*

Two grams of 1,2-dimethyl-4,5-diaminobenzene in 25 ml. of benzene was treated with 5 ml. of carbon disulfide and refluxed for two hours. This was concentrated to dryness in vacuo and the residue was recrystallized from acetone-petroleum ether to yield 1.5 grams of gleaming white crystals of M. P. 315° C. Two recrystallizations from the same solvents yielded pure 2-mercapto-5,6-dimethylbenzimidazole, M. P. 325° C. Anal. Calc'd. for $C_9H_{10}N_2S$: C, 60.65; H, 5.65; N, 15.72. Found: C, 60.82; H, 5.63; N, 15.71.

One gram of 2-mercapto-5,6-dimethylbenzimidazole dissolved in 100 ml. of warm n-butyl alcohol was treated with about 9 grams of Raney nickel catalyst in 100 ml. of n-butyl alcohol and the mixture was refluxed three hours. After filtering and washing the catalyst with n-butyl alcohol, the filtrate was concentrated to dryness in vacuo to yield 609 mg. of white product. This was triturated with 50 ml. of warm acetone, filtered from 32 mg. of unchanged starting material, M. P. 319–24° C., and the filtrate was concentrated to about 10 ml. volume, diluted with petroleum ether and refrigerated overnight to yield 484 mg. of crystalline product, a small portion of which melted at 161–4° C. and the main portion melted at 202–5° C. Recrystallization from acetone-petroleum ether yielded 402 mg. of pure 5,6-dimethylbenzimidazole, M. P. 204–5° C. (no depression in M. P. with known material).

Various changes and modifications may be made in carrying out the present invention without departing from the spirit and scope thereof. Insofar as these changes and modifications are within the purview of the annexed claims, they are to be considered as part of our invention.

What is claimed is:

1. The process for preparing 5,6-dimethylbenzimidazole which comprises reacting 1,2-dimethyl-4,5-diaminobenzene with carbon disulfide, recovering 2-mercapto-5,6-dimethylbenzimidazole from the resulting reaction product, and heating said product with Raney nickel.

2. The process which comprises heating 2-mercapto-5,6-dimethylbenzimidazole with Raney nickel, and recovering 5,6-dimethylbenzimidazole from the resulting reaction product.

References Cited in the file of this patent

UNITED STATES PATENTS

| | | |
|---|---|---|
| 1,933,962 | Bogemann | Nov. 7, 1933 |
| 2,263,014 | Scott | Nov. 18, 1941 |
| 2,509,453 | Russell | May 30, 1950 |
| 2,522,854 | Brink | Sept. 19, 1950 |
| 2,606,187 | Hoffman | Aug. 5, 1952 |